Patented May 29, 1928.

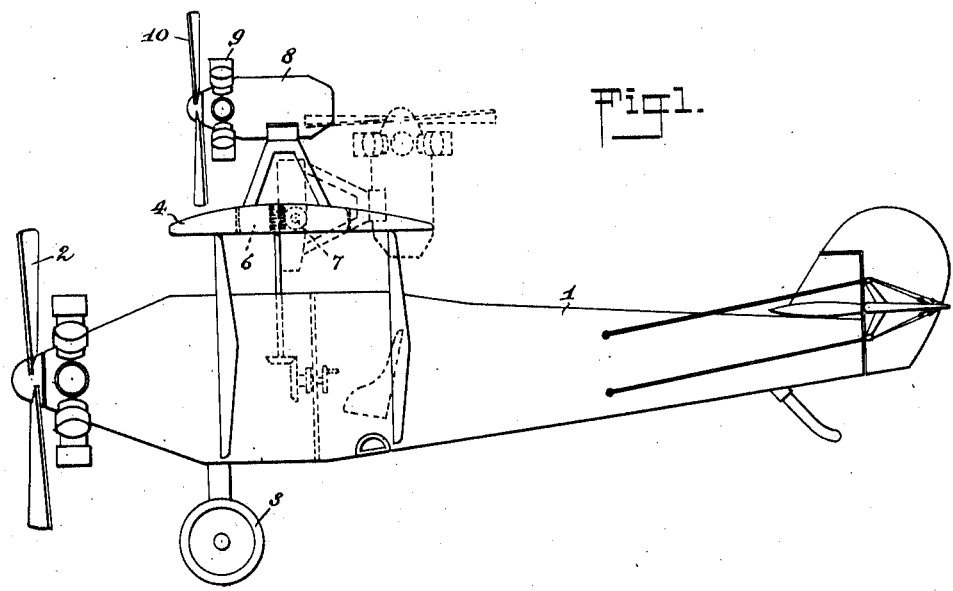
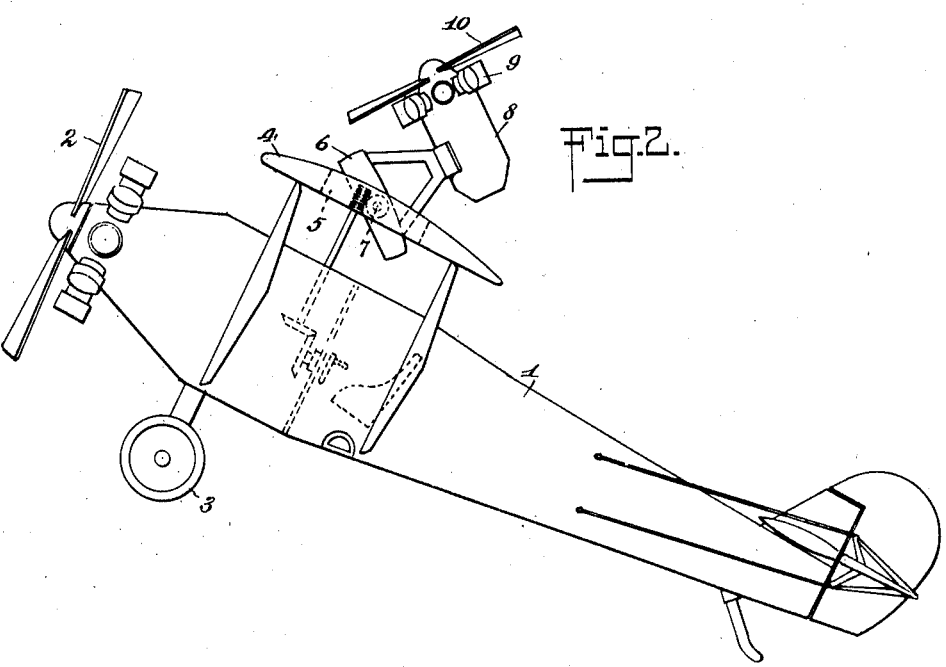

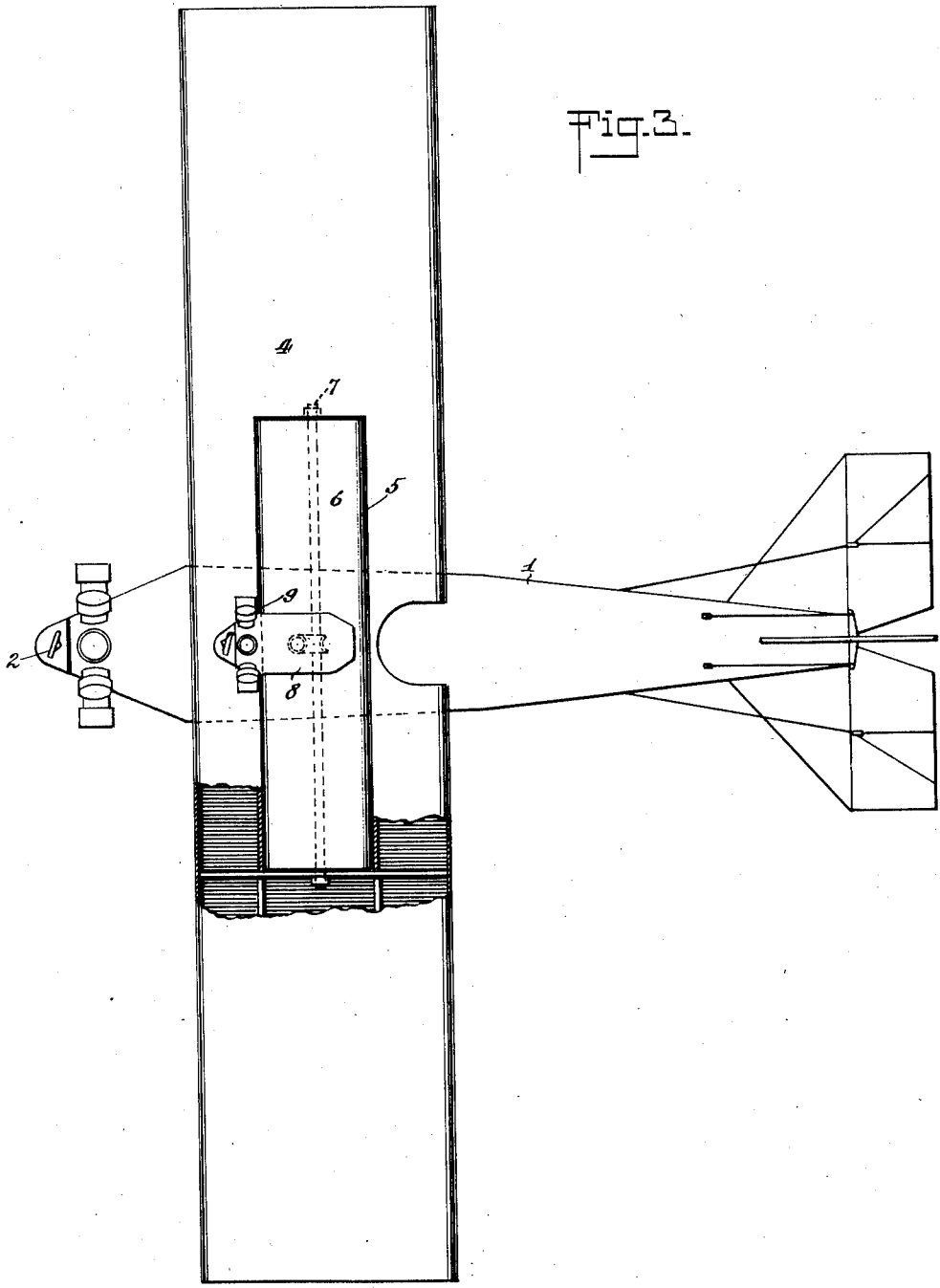

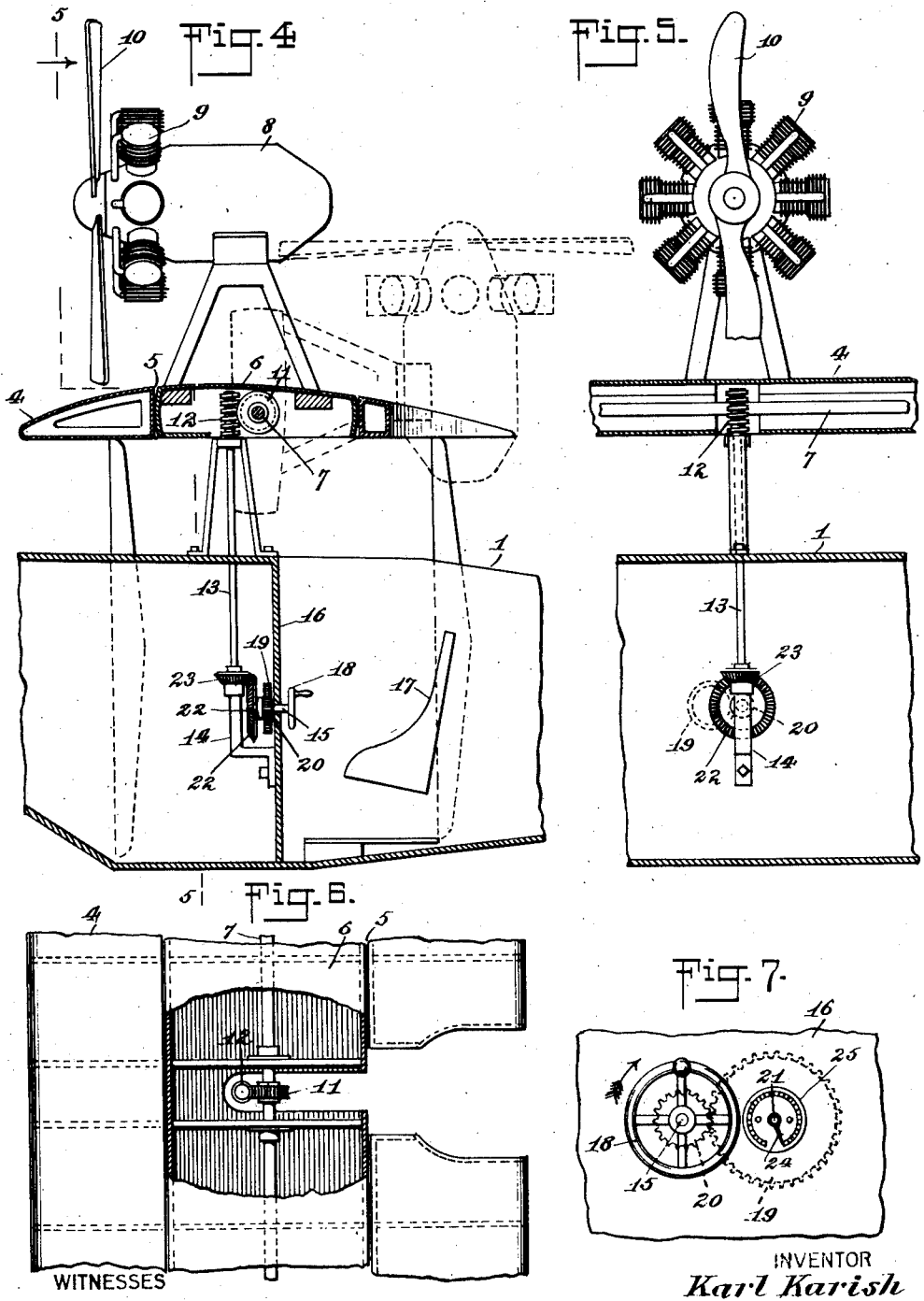

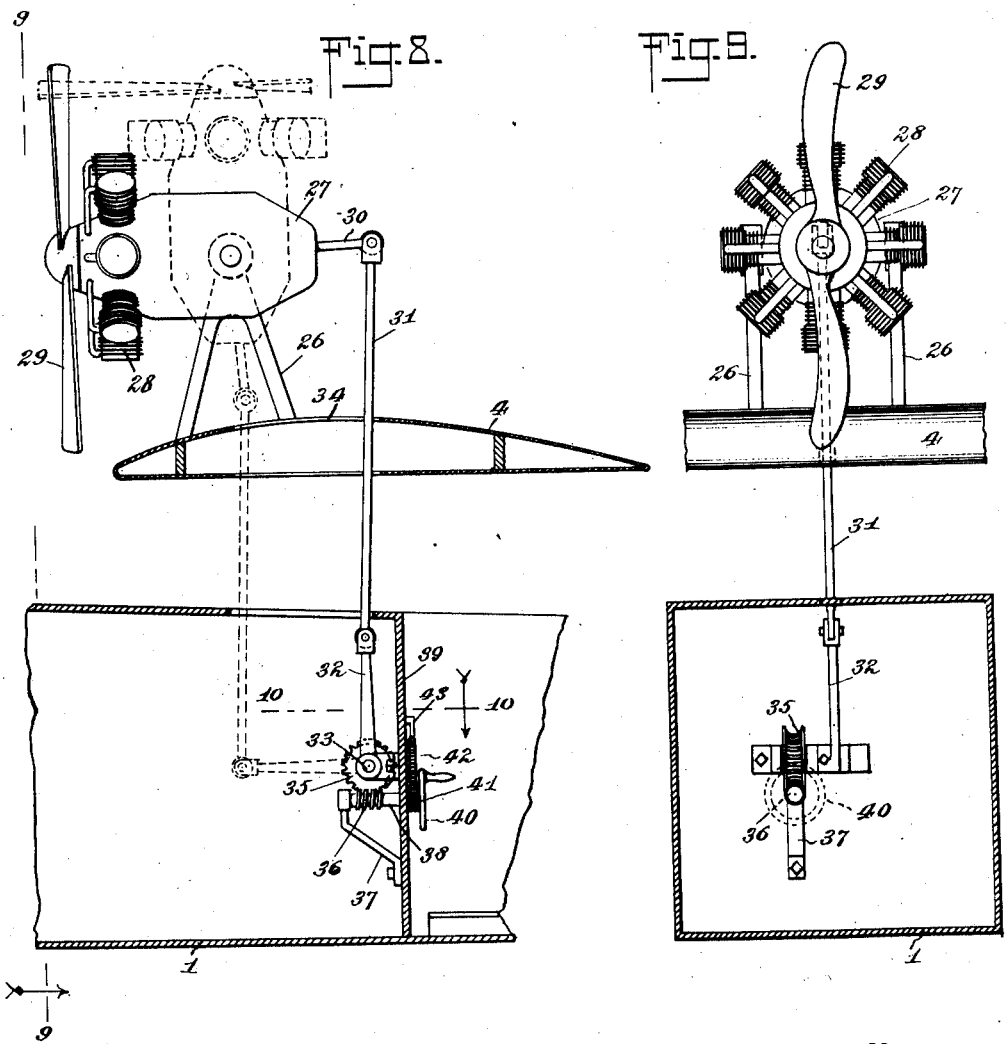

1,671,865

UNITED STATES PATENT OFFICE.

KARL KARISH, OF BROOKLYN, NEW YORK.

AIRCRAFT.

Application filed July 20, 1927. Serial No. 207,165.

This invention relates to aircraft, the primary object of the invention being to provide the aircraft with an auxiliary propeller and engine and to provide means for tilting the mounting of the propeller so that it may be disposed at any angle from a vertical to a horizontal, said engine functioning as an auxiliary to aid in a direct flight, or as an emergency source of power, and also functioning to cause the aircraft to quickly leave the ground and land in a very much smaller space than is possible with aircraft of present design.

My invention has particularly to do with aircraft of the heavier-than-air type and is well adapted for use on monoplanes, biplanes, or other analogous aircraft, and the primary object is to control the ascent or descent of the plane at the will of the pilot, overcoming the necessity of a long run in starting and a long run in landing, or a considerable area or space in landing as compared with the present planes.

While I have illustrated my invention in connection with aircraft of the monoplane type it is to be distinctly understood that the invention is not limited in this particular.

With these and other objects in view, the invention consists in certain novel features of construction and combinations and arrangements of parts which will be more fully hereinafter described and pointer out in the claims.

In the accompanying drawings—

Figure 1 is a view in side elevation, illustrating my improvements as applied to a plane while the latter is on the ground or in direct flight;

Figure 2 is a similar view showing the plane ascending;

Figure 3 is a top plan view of the plane;

Figure 4 is a view in longitudinal section showing my improved auxiliary engine and propeller in position on the wing of a plane;

Figure 5 is a view partly in front elevation and partly in section of Figure 4, the view being taken on the staggered line 5—5 of Figure 4;

Figure 6 is a broken fragmentary plan view, showing the means for tilting the auxiliary motor and its mount;

Figure 7 is a fragmentary face view of the instrument board showing the indicator which indicates the angular disposition of an auxiliary propeller;

Figure 8 is a view similar to Figure 4, illustrating a modification;

Figure 9 is a sectional view looking at the right-hand side of Figure 8;

Figure 10 is a fragmentary perspective view showing the gearing for tilting the auxiliary motor and propeller;

Figure 11 is a fragmentary view in elevation of the instrument board in the modified form of my invention shown in Figures 8, 9 and 10.

1 represents the fuselage, and 2 the propeller which is provided at one end of the fuselage as is customary. The fuselage may have any desired landing gear 3 and is provided with a plane or wing 4, as shown, although of course the invention is not limited to the particular construction of the aircraft as this may be varied to suit the trade.

The wing or plane 4 is made with an opening 5 in which a section 6 is movable and secured to a shaft 7 which is mounted to turn in the main portion of the plane. On this movable section 6 I support a body 8 and motor 9. A propeller 10 is operated by the motor 9 at the front end of the body 8, and this propeller may be of any desired size and any desired formation.

The shaft 7 is provided with a worm wheel 11 fixed thereon which is caused to turn by a worm 12 fixed to a vertical shaft 13 mounted in a suitable bracket 14 secured in the fuselage 1.

A drive shaft 15 projects through the instrument board 16 in front of the pilot's seat 17 and carries a handwheel 18 which the pilot may turn at will. On this shaft 15 a pinion 20 is fixed and meshes with a gear 19 on a countershaft 21. Shaft 15 carries a large bevel gear wheel 22 which meshes with a bevel pinion 23 on shaft 13, so that, when the handwheel 18 is turned, the shaft 13 will be turned through the medium of the gears above described, and the worm 12 will cause the worm wheel 11 and shaft 7 to turn, tilting the movable plane section 6 and the auxiliary motor thereon at any desired angle.

A pointer 24 is fixed to the countershaft 21 and registers with a scale or dial 25 on the instrument board 16 so that the pilot may know exactly at what angle the auxiliary motor and propeller are positioned.

In the modification illustrated in Figures 8, 9, 10 and 11, I dispense with any movable section of the plane or wing 4 and secure a cradle 26 directly to the top of the wing or plane 4 and pivotally mount a body 27 with a motor 28 thereon, and of course employ an auxiliary propeller 29 at the forward end of the engine and body.

This body, engine, and propeller may be pivoted or tilted at the desired angle in many ways, but I have illustrated a rearwardly projecting arm 30 on the body 27 which is connected by a link 31 with a crank arm 32 on a shaft 33, the link of course extending through an opening 34 in the wing or plane 4.

This crank shaft 33 has a worm wheel 35 thereon which is engaged by a worm 36 supported in a bracket 37. The worm 36 is secured on a shaft 38 which projects through the instrument board 39 and has a hand-wheel 40 or other means thereon for turning the same.

A pinion 41 on the shaft 38 in front of the instrument board 39 meshes with a toothed dial 42 having rotary mounting on the instrument board, and a pointer 43 on the instrument board registers with the dial 42 so as to indicate the angle and inclinaton of the auxiliary motor and the auxiliary propeller.

In both forms of my invention I have shown a body 27 constituting a part of the motor and this body may be utilized as a fuel tank, or fuel may be supplied to the motor in any way desired. However, I believe a relatively heavy body such as indicated will give stability to the motor and propeller but I do not wish to be limited in this particular as it is obvious that the engine may be mounted in various ways and supplied with fuel in any way desired.

It is of course obvious that suitable controls will be necessary for the auxiliary motor and other details which form no part of the present invention.

The operation of both forms of my invention are similar in the following respects: In taking off or leaving the ground the auxiliary propeller is set at an angle indicated in Figure 2, the angle in position being entirely under the control of the pilot. The main engine or engines and the auxiliary engine are operated in taking off, and, by reason of the fact that the auxiliary engine and its propeller are at an angle, power will be exerted to quickly move the plane from the ground.

In landing, the auxiliary engine may be turned to any angle desired and may even be turned to vertical, allowing the propeller to move in a horizontal plane so that this auxiliary propeller will functon more or less as a helicopter to allow the landing to be controlled and confined to a relatively small space or area.

In flight, the auxiliary propeller may be used as an aid or it may be idle and used only in an emergency. In any event, the auxiliary engine and propeller will function to assist the plane in taking off, in landing, in elevating and in direct flight at the will of the pilot.

In the preferred form of the invention illustrated the auxiliary motor is mounted to move with the pivoted central section of the plane and it will be noted that when the auxiliary motor is pivoted this pivoted section will be angularly disposed relative to the main portion of the plane and will act as a deflector to assist in elevating the aircraft quickly from the ground.

It will be noted that in both forms of my invention I utilize a worm and worm wheel as part of the power transmission for changing the angular disposition of the auxiliary motor and its propeller, and by reason of this arrangement the parts are held at any position of adjustment without danger of accidental movement.

While I have illustrated and described my invention more or less in detail it is to be understood that I do not wish to be limited to the specific construction but desire to cover broadly the invention as set forth in the appended claims.

I claim:

1. The combination with an airplane, of a tilting section in the wing or plane of the airplane, and an auxiliary motor and propeller supported on said tilting section.

2. The combination with an airplane, of a tilting section in the wing or plane of the airplane, an auxliary motor and propeller supported on said tilting section, and means for tilting the section and the auxiliary propeller.

3. The combination with an aircraft having a wing, said wing having an opening therein, a tilting wing section in said opening, and a propeller supported by said wing section.

4. In combination with the wing of an aircraft having an opening therein, a tilting wing section in said opening, and a propeller on said wing section.

Signed at New York, in the county of New York and State of New York this 18th day of July, A. D. 1927.

KARL KARISH.